United States Patent
Kakuta et al.

(10) Patent No.: US 7,764,293 B2
(45) Date of Patent: Jul. 27, 2010

(54) IMAGE PROCESSING APPARATUS, CONTROL METHOD THEREOF, AND PROGRAM

(75) Inventors: Hiroyuki Kakuta, Yokohama (JP); Toshikazu Ohshima, Kyoto (JP)

(73) Assignee: Canon Kabushiki Kaisha, Tokyo (JP)

( * ) Notice: Subject to any disclaimer, the term of this patent is extended or adjusted under 35 U.S.C. 154(b) by 416 days.

(21) Appl. No.: 11/693,881

(22) Filed: Mar. 30, 2007

(65) Prior Publication Data

US 2007/0236510 A1 Oct. 11, 2007

(30) Foreign Application Priority Data

Apr. 6, 2006 (JP) ............... 2006-105474

(51) Int. Cl.
*G09G 5/00* (2006.01)

(52) U.S. Cl. .................. 345/619; 345/629; 345/633

(58) Field of Classification Search ............... 345/629, 345/619, 633
See application file for complete search history.

(56) References Cited

U.S. PATENT DOCUMENTS

| 5,493,345 | A | * | 2/1996 | Ishikawa et al. | 348/700 |
| 5,589,898 | A | * | 12/1996 | Atkinson | 351/237 |
| 5,625,765 | A | * | 4/1997 | Ellenby et al. | 345/633 |
| 5,815,411 | A | * | 9/1998 | Ellenby et al. | 702/150 |
| 6,160,576 | A | * | 12/2000 | Higuchi et al. | 348/62 |
| 6,362,830 | B1 | * | 3/2002 | Walraven | 345/600 |
| 6,591,008 | B1 | * | 7/2003 | Surve et al. | 382/162 |
| 6,624,828 | B1 | * | 9/2003 | Dresevic et al. | 715/771 |
| 6,633,304 | B2 | * | 10/2003 | Anabuki et al. | 345/633 |
| 6,931,151 | B2 | * | 8/2005 | Weast | 382/162 |
| 7,002,551 | B2 | * | 2/2006 | Azuma et al. | 345/158 |
| 7,127,097 | B2 | * | 10/2006 | Nagatsuka | 382/132 |
| 7,272,785 | B2 | * | 9/2007 | Fukuda et al. | 715/234 |
| 7,394,459 | B2 | * | 7/2008 | Bathiche et al. | 345/175 |
| 7,493,153 | B2 | * | 2/2009 | Ahmed et al. | 600/407 |
| 2003/0014212 | A1 | * | 1/2003 | Ralston et al. | 702/150 |
| 2003/0210228 | A1 | * | 11/2003 | Ebersole et al. | 345/157 |
| 2004/0136570 | A1 | * | 7/2004 | Ullman et al. | 382/114 |

FOREIGN PATENT DOCUMENTS

JP 07-065203 3/1995

* cited by examiner

*Primary Examiner*—M Good Johnson
(74) *Attorney, Agent, or Firm*—Cowan, Liebowitz & Latman, P.C.

(57) ABSTRACT

An acquired real image undergoes conversion based on a first parameter to generate an image corresponding to a designated characteristic. A virtual image is generated on the basis of a second parameter to generate an image corresponding to a designated characteristic. The converted real image is composited with the generated virtual image. The composite image is displayed.

9 Claims, 4 Drawing Sheets

IMAGE PROCESSING APPARATUS, CONTROL METHOD THEREOF, AND PROGRAM

BACKGROUND OF THE INVENTION

1. Field of the Invention

The present invention relates to an image processing apparatus which generates an image to simulate on the basis of the composite image of a real image and a virtual image, a control method thereof, and a program.

2. Description of the Related Art

Three-dimensional CAD systems used for industrial design include a visual simulation system (Japanese Patent Laid-Open No. 07-065203) that reproduces the vision of a visually handicapped person as a CG image on the basis of visual characteristic data. This visual simulation system also proposes visual simulation of a real image as a capture target by controlling the focus and iris of a video camera on the basis of visual characteristic data.

Conventionally, simulation for a CG image and that for a real image are done separately, as in the above-described visual simulation system. In this system, management of various parameters becomes too cumbersome to execute simulation by compositing a real image and a CG image. Additionally, if a CG image and a real image are composited and controlled at once, it is difficult to present an optimum visual simulation image.

SUMMARY OF THE INVENTION

The present invention has been made to solve the above-described problems, and has as its object to provide an image processing apparatus capable of generating an optimum visual simulation image in simulation of the composite image of a real image and a virtual image, a control method thereof, and a program.

According to one aspect of the present invention, an image processing apparatus which generates an image to simulate on the basis of a composite image of a real image and a virtual image, comprises:

storage means for storing a first parameter and a second parameter to generate an image corresponding to a designated characteristic;

acquisition means for acquiring a real image;

conversion means for converting the real image acquired by the acquisition means on the basis of the first parameter;

generation means for generating a virtual image on the basis of the second parameter;

composition means for compositing the real image converted by the conversion means and the virtual image generated by the generation means; and display means for displaying an image composited by the composition means.

In a preferred embodiment, the apparatus further comprises image capturing means for capturing an image, wherein the acquisition means acquires, as the real image, the image captured by the image capturing means.

In a preferred embodiment, the storage means further stores a third parameter corresponding to the designated characteristic, and the image capturing means captures the image on the basis of the third parameter.

In a preferred embodiment, the storage means includes a first storage unit to store the first parameter, and a second storage unit to store the second parameter.

In a preferred embodiment, a first case incorporating the acquisition means, the conversion means, and the first storage unit, and a second case incorporating the generation means, the composition means, the display means, and the second storage unit.

In a preferred embodiment, the first parameter and the second parameter stored in the storage means are parameters related to a visual characteristic.

In a preferred embodiment, the second parameter stored in the storage means is generated on the basis of the image acquired by the acquisition means.

According to another aspect of the present invention, a control method of an image processing apparatus which generates an image to simulate on the basis of a composite image of a real image and a virtual image, comprises:

acquiring a real image;

converting the real image acquired in the acquiring step on the basis of a first parameter that is stored in a storage unit to generate an image corresponding to a designated characteristic;

generating a virtual image on the basis of a second parameter that is stored in the storage unit to generate an image corresponding to a designated characteristic;

compositing the real image converted in the converting step and the virtual image generated in the generating step; and displaying an image composited in the compositing step.

According to still another aspect of the present invention, there is provided with a computer program stored in a computer-readable medium to cause a computer to control an image processing apparatus which generates an image to simulate on the basis of a composite image of a real image and a virtual image. The program causes the computer to execute steps of:

acquiring a real image;

converting the real image acquired in the acquiring step on the basis of a first parameter that is stored in a storage unit to generate an image corresponding to a designated characteristic;

generating a virtual image on the basis of a second parameter that is stored in the storage unit to generate an image corresponding to a designated characteristic;

compositing the real image converted in the converting step and the virtual image generated in the generating step; and displaying an image composited in the compositing step.

Further features of the present invention will become apparent from the following description of exemplary embodiments with reference to the attached drawings.

DESCRIPTION OF THE EMBODIMENT

A preferred embodiment of the present invention will now be described in detail with reference to the drawings. It should be noted that the relative arrangement of the components, the numerical expressions and numerical values set forth in these embodiments do not limit the scope of the present invention unless it is specifically stated otherwise.

Figure 1:
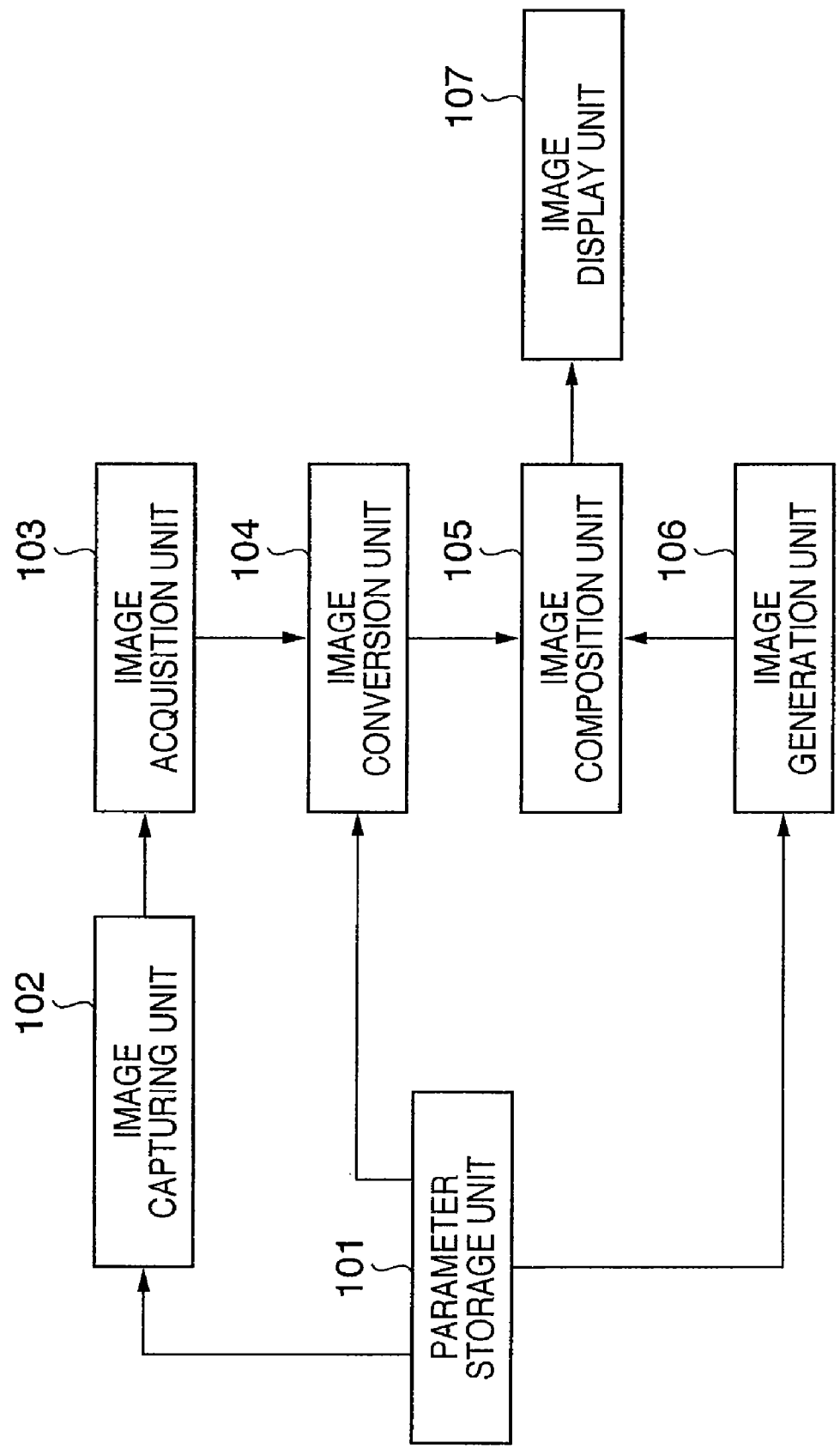
FIG. 1 is a block diagram showing the functional arrangement of an image display system according to the embodiment of the present invention.

FIG. 1 is a block diagram showing the functional arrangement of an image display system according to the embodiment of the present invention.

The image display system comprises a parameter storage unit 101 that holds various parameters, an image capturing unit 102 that captures an object, and an image acquisition unit 103 that acquires the captured image from the image capturing unit 102. The image display system also comprises an image conversion unit 104 that converts the captured image on the basis of the parameters stored in the parameter storage unit 101, and an image generation unit 106 that generates an image on the basis of the parameters stored in the parameter storage unit 101.

The image display system also comprises an image composition unit 105 that composites the image converted by the image conversion unit 104 with the image generated by the image composition unit 105, and an image display unit 107 that displays the composite image obtained from the image composition unit 105.

The parameter storage unit 101 holds various parameters (to be described later in detail). Upon activating the image display system, the parameter storage unit 101 transmits the various parameters to the image capturing unit 102, image conversion unit 104, and image generation unit 106.

The image display system can be implemented by an information processing apparatus (or image processing apparatus) such as a personal computer. The personal computer includes, e.g., a CPU, RAM, ROM, hard disk, display, keyboard, pointing device, image input unit, and network interface.

The image display system in FIG. 1 may be implemented either by a single information processing apparatus or by distributing its internal function to a plurality of information processing apparatuses.

For example, the parameter storage unit 101 which stores the plurality of kinds of parameters may be divided into a first storage unit to store first parameters and a second storage unit to store second parameters on the basis of the parameter types. In this arrangement, the image display system can be implemented by a first information processing apparatus and a second information processing apparatus.

The first information processing apparatus includes a first case incorporating the image acquisition unit 103, image conversion unit 104, and first storage unit. The second information processing apparatus includes a second case incorporating the image generation unit 106, image composition unit 105, image display unit 107, and second storage unit. This arrangement can reduce the process load on the whole system.

Control of a real image by the image capturing unit 102 will be described next with reference to FIG. 2.

Figure 2:
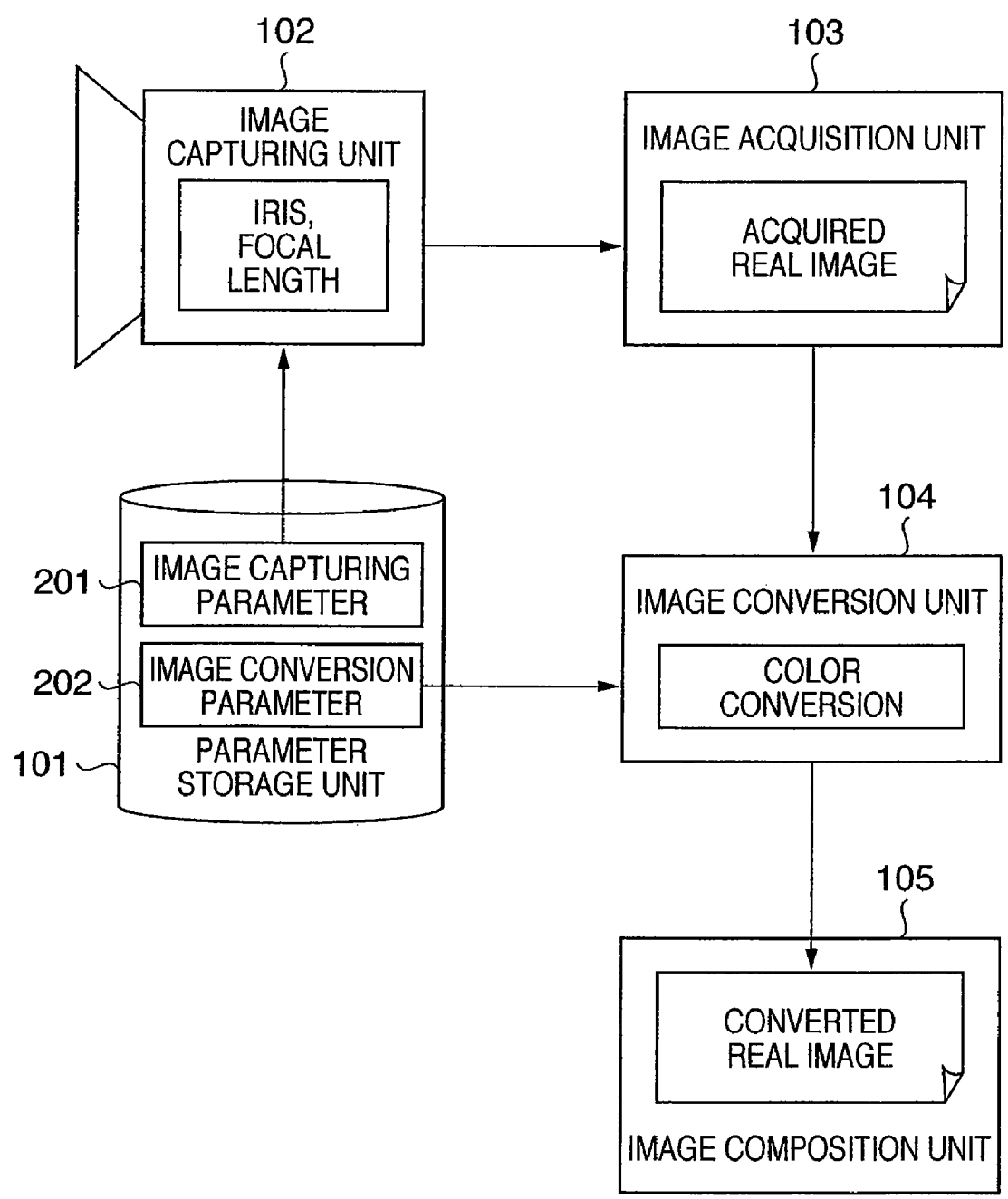
FIG. 2 is a block diagram for explaining control of a real image according to the embodiment of the present invention.

FIG. 2 is a block diagram for explaining control of a real image according to the embodiment of the present invention.

The image capturing unit 102 implemented by an image capturing device such as a video camera receives a control instruction (to be described later in detail) from the parameter storage unit 101, captures a physical space, and transmits the image capturing signal to the image acquisition unit 103.

The image acquisition unit 103 acquires the image capturing signal output from the image capturing unit 102 and executes a digital process for the acquired image capturing signal to generate image data. The generated image data is transmitted to the image conversion unit 104.

The image conversion unit 104 receives a control instruction (to be described later in detail) from the parameter storage unit 101, converts the image capturing signal (real image) acquired from the image acquisition unit 103, and transmits the converted real image to the image composition unit 105.

On the other hand, the image generation unit 106 receives a control instruction (to be described later in detail) from the parameter storage unit 101, generates a virtual space image, and transmits the generated virtual image to the image composition unit 105.

The detailed arrangement of the image generation unit 106 will be described next with reference to FIG. 3.

Figure 3:
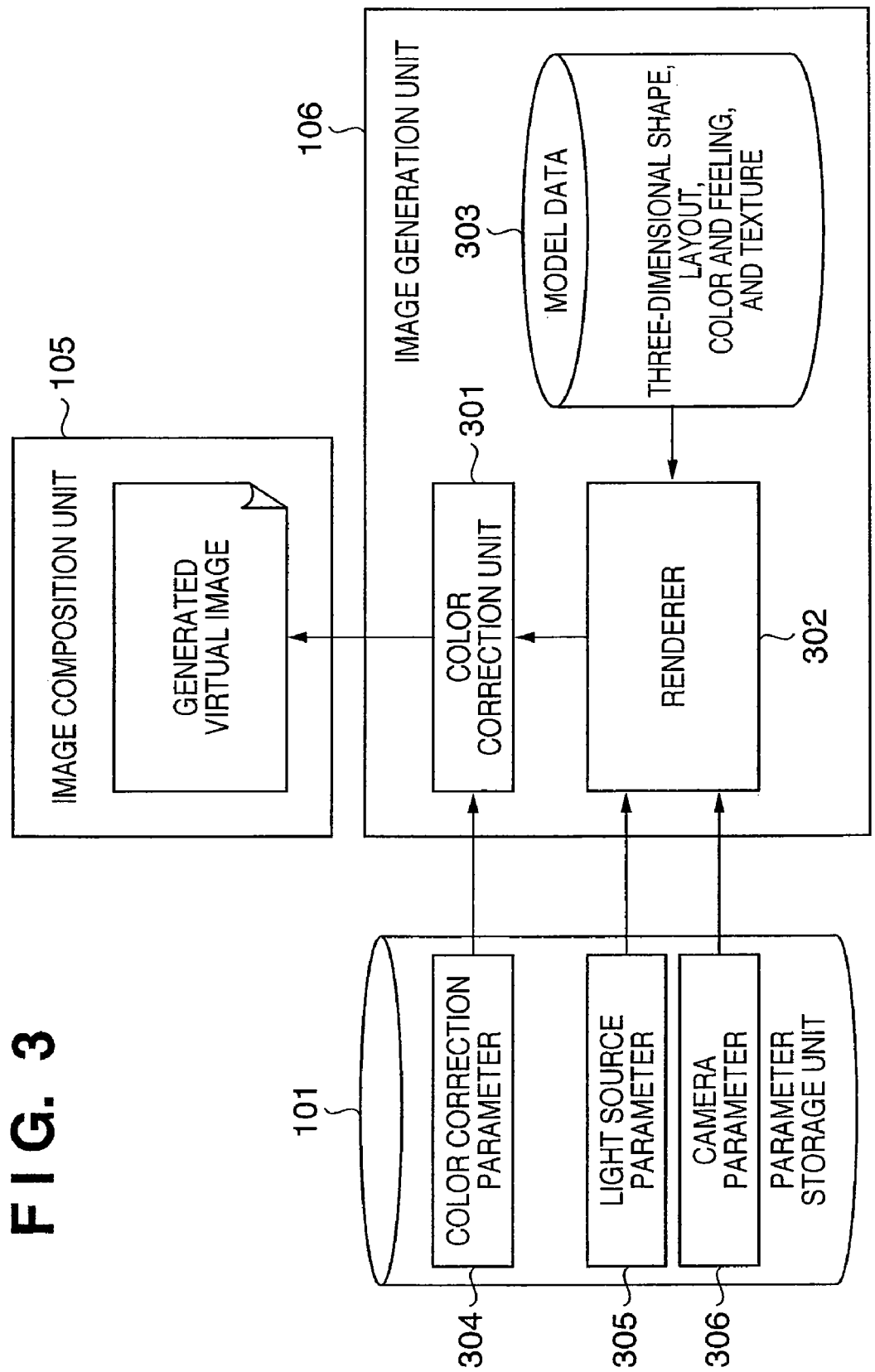
FIG. 3 is a block diagram showing the detailed arrangement of an image generation unit according to the embodiment of the present invention.

FIG. 3 is a block diagram showing the detailed arrangement of the image generation unit according to the embodiment of the present invention.

The image generation unit 106 holds a renderer 302 and model data 303 which are necessary for generating a general virtual image (virtual space image), and a color correction unit 301 that executes color correction for the virtual image generated by the renderer 302.

The model data 303 is information about, e.g., the shape, layout, and color and feeling of a three-dimensional object, and texture to be mapped on its surface. The model data 303 is formed on, e.g., a database. The renderer 302 executes a process by referring to the model data 303 upon processing.

The renderer 302 receives a control instruction (to be described later in detail) from the parameter storage unit 101, determines the settings of the light source and camera in the virtual space, and executes so-called rendering on the basis of the information of the model data 303. The method of causing the renderer 302 to generate a virtual image is a known technique, and a detailed description thereof will be omitted.

The image composition unit 105 executes a composition process by using the real image converted by the image conversion unit 104 as a background image and the virtual image generated by the image generation unit 106 as a foreground image. The generated composite image is transmitted to the image display unit 107.

The image display unit 107 presents the composite image generated by the image composition unit 105 to the user.

In this embodiment, an example of simulation which has a function of presenting simulation based on both the characteristic of a shortsighted person and that of a colorblind person will be described.

To implement the above-described simulation, the parameter storage unit 101 holds a plurality of parameters. The parameters and the control instructions output from the parameter storage unit 101 to the image capturing unit 102, image conversion unit 104, and image generation unit 106 will be described below in detail with reference to FIGS. 2 and 3.

Referring to FIG. 2, the parameter storage unit 101 transmits an image capturing parameter 201 to the image capturing unit 102. The image capturing parameter 201 defines image capturing conditions such as the focal length and F-number of the image capturing unit 102 and gives a control effect to the signal upon image capturing in accordance with the visual characteristics of a shortsighted person. For example, to simulate defocus as a visual characteristic of a shortsighted person, a value to decrease the focal length of the image capturing unit 102 and open the iris is set in the image capturing parameter 201.

The parameter storage unit 101 transmits an image conversion parameter 202 to the image conversion unit 104. The image conversion parameter 202 defines the value of color conversion to be executed by the image conversion unit 104 and gives a control effect to the real image acquired by the image acquisition unit 103 in accordance with the visual characteristics of a colorblind person. For example, to simulate the visual characteristics of a red-colorblind person, a value to reduce red hue discrimination in the color conversion process executed by the image conversion unit 104 is set in the image conversion parameter 202.

Referring to FIG. 3, the parameter storage unit 101 transmits a camera parameter 306 to the renderer 302. The camera parameter 306 defines values such as the focal length and depth of field of a virtual camera in causing the renderer 302 to render the virtual space and gives a control effect to the generated virtual image in accordance with the visual characteristics of a shortsighted person. For example, to simulate the visual characteristics of a shortsighted person, a value to decrease the focal length of the virtual camera and shallow the field of depth is set in the camera parameter 306.

In this embodiment, the position and orientation values of the image capturing unit 102 are measured in advance. The measured values are input to the camera parameter 306 and used as the position and orientation values of the virtual camera. This allows the image generation unit 106 to generate an image of the virtual space observed from the position and orientation of the image capturing unit 102. Hence, the spatial positional shift that occurs in compositing the real image and virtual image can be eliminated.

The parameter storage unit 101 transmits a light source parameter 305 to the renderer 302. The light source parameter 305 defines values such as the color, brightness, and layout of a virtual light source in causing the renderer 302 to render the virtual space and gives a control effect to the generated virtual image in accordance with the illumination state in the physical space. For example, if the color of illumination in the physical space captured by the image capturing unit 102 is white, a value to set the virtual light source color to white is input to the light source parameter 305.

The light source parameter 305 may be generated on the basis of the real image acquired from the image acquisition unit 103.

The parameter storage unit 101 transmits a color correction parameter 304 to the color correction unit 301. The color correction parameter 304 defines the value of color correction to be executed by the color correction unit 301 and gives a control effect to the virtual image rendered by the renderer 302 in accordance with the visual characteristics of a colorblind person. For example, to simulate the visual characteristics of a red-colorblind person, a value to reduce red hue discrimination in the color correction process is set in the color correction parameter 304.

Control of the image display system according to the embodiment will be described next with reference to FIG. 4.

As a characteristic feature of the image display system, the parameter storage unit 101 manages the parameters to generate a real image and a virtual image (e.g., CG) in correspondence with each visual characteristic, and each of the real and virtual images is processed before compositing them. This arrangement allows to obtain wide-ranging and consistent visual simulation images, as compared to a system that executes a conversion process for a visual light image obtained by compositing a real image and a virtual image.

Figure 4:
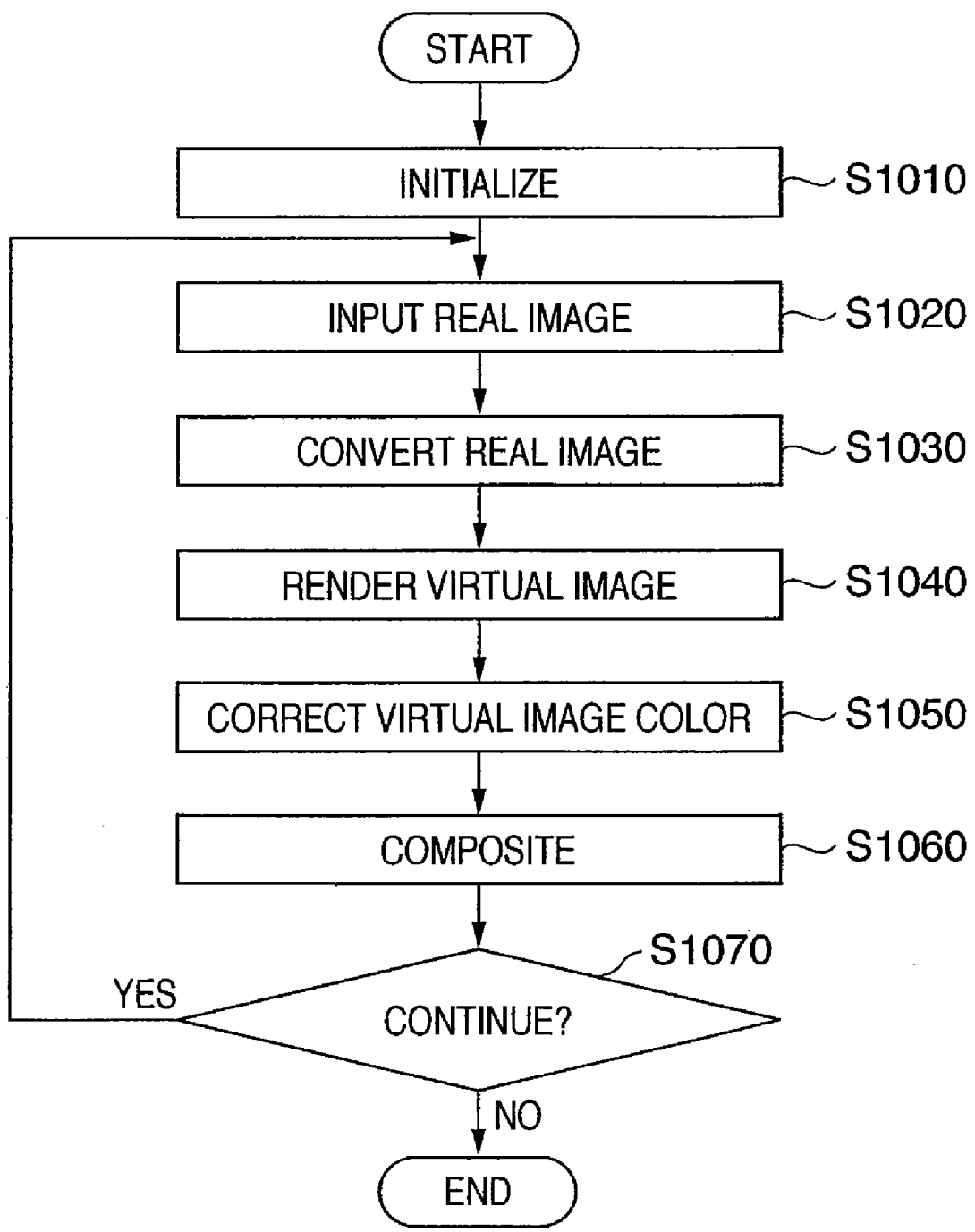
FIG. 4 is a flowchart showing control of the image display system according to the embodiment of the present invention.

FIG. 4 is a flowchart showing control of the image display system according to the embodiment of the present invention.

The image display system of this embodiment is activated and initialized in step S1010. In the initialization process, the parameter storage unit 101 transmits the control parameters to the image capturing unit 102, image conversion unit 104, and image generation unit 106. More specifically, the parameter storage unit 101 transmits the image capturing parameter 201 to the image capturing unit 102 and the image conversion parameter 202 to the image conversion unit 104. The parameter storage unit 101 also transmits the color correction parameter 304 to the color correction unit 301 and the light source parameter 305 and camera parameter 306 to the renderer 302.

In step S1020, the image capturing unit 102 that has received the control instruction from the parameter storage unit 101 captures the physical space in accordance with a short sight characteristic. The image acquisition unit 103 receives the image capturing signal as real image data.

In step S1030, the image conversion unit 104 that has received the control instruction from the parameter storage unit 101 executes real image conversion corresponding to a colorblind characteristic for the real image data received in step S1020.

In step S1040, the image generation unit 106 that has received the control instruction from the parameter storage unit 101 renders a virtual image corresponding to illumination in the physical space and the short sight characteristic on the basis of the model data 303.

In step S1050, the color correction unit 301 that has received the control instruction from the parameter storage unit 101 executes color correction corresponding to the colorblind characteristic for the virtual image rendered in step S1040.

In step S1060, the composition process is executed by using the real image converted in step S1030 as a background image and the virtual image that has undergone color correction in step S1050 as a foreground image. The image display unit 107 displays the composite image obtained by the composition process.

In step S1070, it is determined whether to continues the process. If the process should continue (YES in step S11070), the process returns to step S1020. If the process should not continue (NO in step S1070), the process is ended.

The order of some steps of the process procedures in FIG. 4 may be changed.

For example, step S1020 and step S1040 can interchange. Step S1030 only needs to finish before step S1020. Step S1040 only needs to finish before step S1050. Especially, step S1020 and step S1040 do not depend on each other. Hence, interchange of these steps does not affect control of the image display system of this embodiment.

As described above, according to this embodiment, control parameters are collectively stored, thereby preventing parameter management from becoming cumbersome. As image control corresponding to visual characteristics, control suitable for a real image is executed for a real image while control suitable for a virtual image is executed for a virtual image. After that, a composite image is generated. It is therefore possible to present optimum visual simulation as compared to a system that executes control after composition.

Note that the present invention can be applied to an apparatus comprising a single device or to system constituted by a plurality of devices.

Furthermore, the invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention are implemented by computer, the program code installed in the computer also implements the present invention. In other words, the claims of the present invention also cover a computer program for the purpose of implementing the functions of the present invention.

In this case, so long as the system or apparatus has the functions of the program, the program may be executed in any form, such as an object code, a program executed by an interpreter, or scrip data supplied to an operating system.

Example of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM and a DVD-R).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

It is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Besides the cases where the aforementioned functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-105474 filed on Apr. 6, 2006, which is hereby incorporated by reference herein in its entirety.

What is claimed is:

1. An image processing apparatus for simulating an eyesight of vision disorder which generates a composite image of a real image and a virtual image, comprising:
   a storage unit adapted to store a first parameter and a second parameter to generate an image corresponding to an eyesight characteristic of vision disorder;
   an acquisition unit adapted to acquire a real image;
   a conversion unit adapted to convert the real image acquired by the acquisition unit into a real image simulating the eyesight of the vision disorder on the basis of the first parameter;
   a generation means unit adapted to generate a virtual image simulating the eyesight of the vision disorder on the basis of the second parameter, the virtual image corresponding three dimensional model data;
   a composition unit adapted to generate a composite image of the real image converted by the conversion unit and the virtual image generated by the generation unit; and
   a display unit adapted to display the composite image by the composition unit.

2. The apparatus according to claim 1, further comprising image capturing unit for capturing an image,
   wherein the acquisition unit acquires, as the real image, the image captured by the image capturing unit.

3. The apparatus according to claim 2, wherein
   the storage unit further stores a third parameter corresponding to the an eyesight characteristic of the vision disorder, and
   the image capturing unit captures the image on the basis of the third parameter.

4. The apparatus according to claim 1, wherein the storage unit includes a first storage unit to store the first parameter, and a second storage unit to store the second parameter.

5. The apparatus according to claim 4, further comprising a first case and a second case,
   wherein the first case includes the acquisition unit, the conversion unit, and the first storage unit, and
   the second case includes the generation unit, the composition unit, the display unit, and the second storage unit.

6. The apparatus according to claim 1, wherein the eyesight characteristic of the vision disorder includes low vision characteristic or defective color vision characteristic.

7. The apparatus according to claim 1, wherein the second parameter stored in the storage unit is generated on the basis of the image acquired by the acquisition unit.

8. A control method implemented by an image processing apparatus for simulating, an eyesight of vision disorder, the control method causing the image processing apparatus to generate a composite image of a real image and a virtual image, comprising steps of:
   acquiring a real image;
   converting the real image acquired in the acquiring step into a real image simulating the eyesight of the vision disorder on the basis of a first parameter that is stored in a storage unit of said image processing apparatus to generate an image corresponding to an eyesight characteristic of the vision disorder;
   generating a virtual image simulating the eyesight of the vision disorder on the basis of a second parameter that is stored in the storage unit to generate an image corresponding to an eyesight characteristic of the vision disorder, the virtual image corresponding on the basis of three dimensional model data;
   generating a composite image of the real image converted in the converting step and the virtual image generated in the generating step; and
   displaying on a display device a composite image composited in the compositing step.

9. A non-transitory computer-readable storage medium having stored therein a computer program, executable by a computer, the computer program causing the computer to control an image processing apparatus for simulating an eyesight of vision disorder which generates a composite image of a real image and a virtual image, the computer program causing the computer to execute steps of:

acquiring a real image;
converting the real image acquired in the acquiring step into a real image simulating the eyesight of the vision disorder on the basis of a first parameter that is stored in a storage unit of said computer to generate an image corresponding to an eyesight characteristic of the vision disorder;
generating a virtual image simulating the eyesight of the vision disorder on the basis of a second parameter that is stored in the storage unit to generate an image corresponding to an eyesight characteristic of the vision disorder, the virtual image corresponding three dimensional model data;
generating a composite image of the real image converted in the converting step and the virtual image generated in the generating step; and
displaying on a display device a composite image composited in the compositing step.

* * * * *